United States Patent [19]

Nishikawa

[11] Patent Number: 4,566,074
[45] Date of Patent: Jan. 21, 1986

[54] SCINTILLATION CAMERA
[75] Inventor: Mineki Nishikawa, Tochigi, Japan
[73] Assignee: Tokyo Shibaura Denki Kabushiki Kaisha, Tokyo, Japan
[21] Appl. No.: 309,845
[22] Filed: Oct. 8, 1981
[51] Int. Cl.$^4$ ............................................. G01T 1/20
[52] U.S. Cl. .................... 364/571; 364/414; 250/363 S; 250/369
[58] Field of Search ............... 364/414, 571; 250/363 S, 369

[56] References Cited

U.S. PATENT DOCUMENTS

| | | | |
|---|---|---|---|
| 3,732,419 | 5/1973 | Kulberg et al. | 250/366 |
| 3,732,420 | 5/1973 | Brunnett et al. | 250/252.1 |
| 3,745,345 | 7/1973 | Muehllehner | 250/363 R |
| 3,904,530 | 9/1975 | Martone et al. | 250/369 |
| 3,908,128 | 9/1975 | Richey | 250/366 |
| 3,911,278 | 10/1975 | Stout | 250/366 |
| 3,953,735 | 4/1976 | Stout | 250/363 S |
| 3,983,394 | 9/1976 | Martone et al. | 250/363 S |
| 4,060,730 | 11/1977 | Zioni et al. | 250/369 |
| 4,093,857 | 6/1978 | Lapidus | 250/369 |
| 4,142,102 | 2/1979 | Lange | 250/369 |
| 4,151,416 | 4/1979 | Richey et al. | 250/363 S |
| 4,179,607 | 12/1979 | Lange et al. | 364/414 |
| 4,200,793 | 4/1980 | Nagasawa et al. | 250/363 S |
| 4,223,221 | 9/1980 | Gambini et al. | 250/363 S |
| 4,223,388 | 9/1980 | Nishikawa et al. | 364/571 |
| 4,298,944 | 11/1981 | Stoub et al. | 364/571 |
| 4,316,257 | 2/1982 | Del Medico et al. | 364/571 |
| 4,323,977 | 4/1982 | Arseneau | 364/414 |

Primary Examiner—Gary Chin
Attorney, Agent, or Firm—Cushman, Darby & Cushman

[57] ABSTRACT

A scintillation camera including an arrangement for correcting for a non-linear response of scintillation. Reference correcting amounts determined during calibration mode operation are stored at lattice points in a matrix corresponding to position signals applied from a radiation position calculation circuit, position signal applied from the radiation position calculation circuit is A/D-converted every scintillation event. During a measuring mode operation, a correcting amount relating to a point on coordinates is calculated on the basis of reference correcting amount at each lattice point in a unit lattice region, the lattice points enclosing the point on coordinates which corresponds to the digitalized position signal. The correcting amount is added to position signal applied from the radiation position calculation circuit. First and second random generators are arranged to apply first and second independent random data for every scintillation event. These first and second random data are added, as lower grade bits, to X and Y components of the position signal and the correcting amount at the point on coordinates is calculated taking these added data for a detected position signal.

3 Claims, 8 Drawing Figures

SCINTILLATION CAMERA

BACKGROUND OF THE INVENTION

The present invention relates to a scintillation camera capable of correcting errors in detected radiation position to provide a tomogram of high accuracy, said errors in detected radiation position being caused due to the non-linearity detection characteristic of radiation detector.

There have been conventionally used scintillation cameras wherein radiation or gamma ray radiated from human body or the like into which radio-isotope was injected is detected to provide a tomogram necessary to make a diagnosis relating to a desired portion of human body. The radiation detecting device incorporated into the scintillation camera an inherent non-linear detection characteristic and the tomogram detected comes to have distortion unless non-linearity detection characteristic is corrected.

There is known in the art a scintillation camera capable of effectively correcting non-linearity detection characteristic. This known scintillation camera comprises a radiation detector for detecting radiation or gamma ray, a position calculating circuit for calculating, responsive to outputs applied from the radiation detector, radiation emitting positions which will be hereinafter referred to as radiation positions or positions, an A/D converter for converting outputs or position signals to digital signals, position signals being applied from the position calculating circuit, a memory for storing a reference correcting amount for each of a plurality of lattice points of a given matrix optionally determined on an X-Y plane, the reference correcting amounts being used to correct position signals, which have been converted to digital signals by the A/D converter, to accurate position signals representing accurate positions and the position signals already including error components due to non-linear detection characteristic inherent in the radiation detector and representing no correct positions or accurate positions on X-Y plane corresponding to actual positions, a correcting amount calculation circuit for reading out reference correcting amounts in four cross points in the memory adjacent to calculated positions so as to correct calculated radiation positions, which have been calculated by the position calculating circuit and digitalized by the A/D converter, to accurate positions in a measuring mode and for calculating correcting amounts to correct calculated positions to accurate positions, the four cross points containing calculated positions in an area formed by connecting four cross points with one another by straight lines, an adder for adding the calculated correcting amount to the calculated position, and a display device for displaying resultant positions to visualize a tomogram relating to a desired portion of human body.

Since the scintillation camera of this type carries out correction of non-linearity of position calculation circuit in a data processing manner, adjustment relating to variation per hour and the like can be relatively easily achieved and correction of high accuracy can also be attained without degrading resolving-power, quality of picture and the like.

Figure 1:
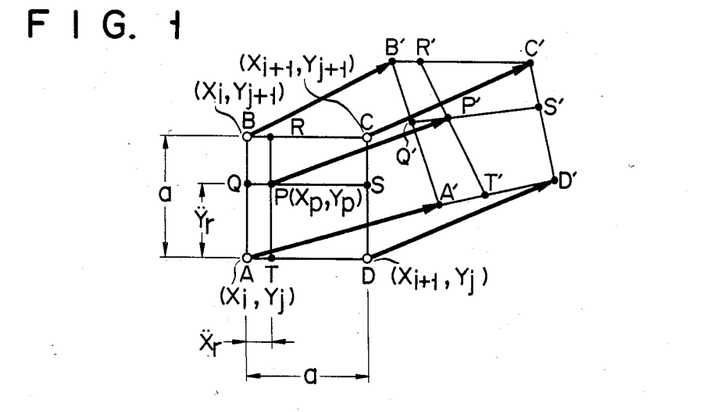
FIG. 1 shows a correcting mode to seek for accurate radiation positions.

Operation in the correcting amount calculation circuit is carried out as follows: It is assumed that a calculated radiation position P(Xp,Yp) converted by the A/D converter to a digital value is contained, as shown in FIG. 1, in an area enclosed by four cross points A($X_i,Y_j$), B($X_i,Y_{j+1}$), C($X_{i+1},Y_{j+1}$) and D($X_{i+1},Y_j$) of a given matrix in the memory. In this case, reference correcting amounts ($X_{i,j}$; $Y_{i,j}$), ($X_{i,j+1}$; $Y_{i,j+1}$), ($X_{i+1,j+1}$; $Y_{i+1,j+1}$) and ($X_{i+1,j}$; $Y_{i+1,j}$) at four cross points A, B, C and D are read out of memory by the correcting amount calculation circuit.

Figure 2:
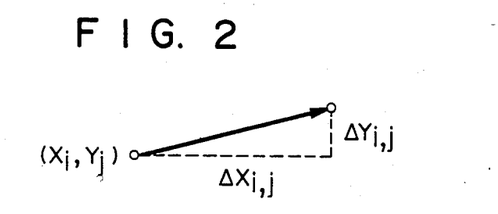

Reference correcting amount ($X_{i,j}$; $Y_{i,j}$) will be explained with reference to FIG. 2, $X_{i,j}$ represents an X component of correcting vector and $Y_{i,j}$ a Y component thereof. The same is true of other reference correcting amounts. It is now assumed that corrected accurate positions of four lattice points A, B, C and D and A', B', C' and D' and that cross points formed by drawing vertical lines from position P(Xp,Yp) toward sides AB, BC, CD and DA, respectively, are Q, R, S and T. The following relations expressed by equations (1), (2), (3) and (4) are established in this case:

$$BQ: QA = B'Q': Q'A' \quad (1)$$

$$BR: RC = B'R': R'C' \quad (2)$$

$$Cs: Sd = C'S': S'D' \quad (3)$$

$$DT: TA = D'T': T'A' \quad (4)$$

A cross point P' between lines R'T' and Q'S' can be obtained from above-mentioned relations. Vector PP' now becomes a correcting vector corresponding to a correcting amount in relation to position P.

When correction of non-linearity is carried out like this in the scintillation camera, correction of higher accuracy can be achieved as quantizing bit number of A/D converter becomes larger and larger.

However, as quantizing bit number of A/D converter becomes larger and larger, the A/D converter becomes complicated in arrangement, high in cost and slow in converting speed. It is therefore desirable that an A/D converter having as few a quantizing bit number as possible but so few a quantizing bit number as to have no influence to correction accuracy is employed.

When theoretical consideration is paid to resolving-power, it is unnecessary that the A/D converter has a large quantizing bit number and the quantizing bit number may be such that it is obtained by applying the sampling theorem to space frequency corresponding to the resolving-power determined by the device itself.

When the quantizing bit number of the A/D converter becomes small, however, resolving-power is not lowered theoretically, but the following practical problem is caused.

Figure 3:
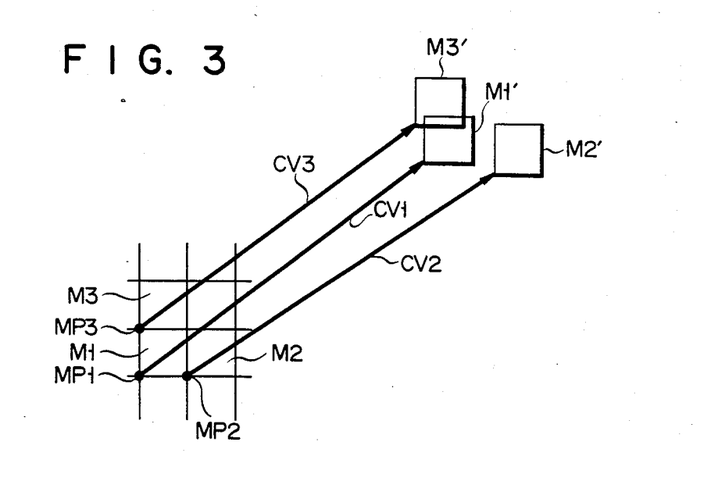
FIG. 3 is a view used to explain a problem caused when detected position signals are quantized by an A/D converter.

Namely, it is assumed that M1, M2, M3, ... shown in FIG. 3 are unit meshes for quantizing position signals by the A/D converter. All points contained in each of unit meshes M1, M2, M3, ... are collected and recognized as typical points MP1, MP2, MP3, ... by A/D conversion of A/D converter. Correcting vectors CV1, CV2, CV3, ... corresponding to typical points MP1, MP2, MP3, ... are calculated by the correcting amount calculation circuit. Since these correcting vectors CV1, CV2, CV3, ... are obtained on the basis of MP1, MP2, MP3, ... which are typical points of unit meshes M1, M2, M3, ... they are applied to all points contained in unit meshes M1, M2, M3, ... Therefore, all of positions corrected on the basis of correcting vector CV1 are contained in a unit region M1' primarily determined by correcting vector CV1. All of positions corrected on the basis of correcting vector CV2 are included in a unit region M2' primarily determined by correcting vector CV2. Similarly, all of positions corrected on the basis of correcting vector CV3 are included in a region M3' primarily determined by correcting vector CV3. As described above, unit regions M1', M2', M3', . . . in which corrected positions are included are limited to those corresponding to unit regions M1, M2, M3, . . . and positions of unit regions M1', M2', M3', . . . themselves are limited by correcting vectors corresponding to typical points MP1, MP2, MP3, . . . of unit meshes. Therefore, in regions where correcting vectors adjacent to each other intend to become more remote from each other as compared with them before correction, an area which is not covered by unit regions is caused as shown by unit regions M1' and M2'. Namely, a region where non-corrected position is present is caused. In regions where correcting vectors adjacent to each other intend to become nearer as compared with them before correction, an area where unit regions are overlapped each other is caused as shown by unit regions M1' and M3'. Namely, a region where corrected positions are overlapped one another is caused.

The accuracy of a tomogram obtained is lowered due to irregular correction like this. However, it is not desirable that an A/D converter having a larger quantizing bit number than needed in the viewpoint of resolving-power is employed only for the purpose of eliminating errors caused due to irregular correction.

SUMMARY OF THE INVENTION

The present invention is intended to eliminate above-mentioned drawbacks.

The object of the present invention is therefore to provide a scintillation camera having simple construction capable of overcoming the irregularity in correcting non-linearity, using an A/D converter having as small a quantizing bit number as possible to lower the cost, and providing a high accurate tomogram.

According to the present invention there is provided a scintillation camera comprising a radiation detection means for detecting radiation from every scintillation event; a radiation position calculation means for calculating radiation positions from output signals applied from the radiation detection means; an A/D converter means for converting analog output position signals applied from the radiation position calculation means to digital position signals; a first memory means for storing in calculation mode the picture of a reference radiation source having a plurality of holes arranged in matrix; an arithmetic unit for seeking in each of lattice points in a matrix the discrepancy between an actual position in the reference radiation source and its corresponding position in the picture stored in the first memory means and calculating a reference correcting amount from the discrepancy amount in each of lattice points; a second memory means for storing the calculated correcting amount in its corresponding lattice point of its corresponding matrix; first and second random generator means for applying first and second independent random data every scintillation event in measuring mode; a correcting amount calculation means for receiving a position signal applied from the A/D converter means and first and second random data applied from first and second random generator means to take the data including X component in the position signal as a higher order bit and the first random data as a lower order bit for a detected X position and also to take the data including Y component in the position signal as a higher order bit and the second random data as a lower order bit for a detected Y position in measuring mode and reading out, on the basis of these data, reference correcting amounts in lattice points enclosing the position of position signal in the matrix of second memory means to calculate a correcting amount relating to the position; and an adder means for adding calculated correcting amounts to position signals applied from the A/D converter means.

BRIEF DESCRIPTION OF THE DRAWINGS

FIG. 2 shows vectors in X and Y directions when position A in FIG. 1 is based on;

DETAILED DESCRIPTION OF THE PREFERRED EMBODIMENT

Figure 4:
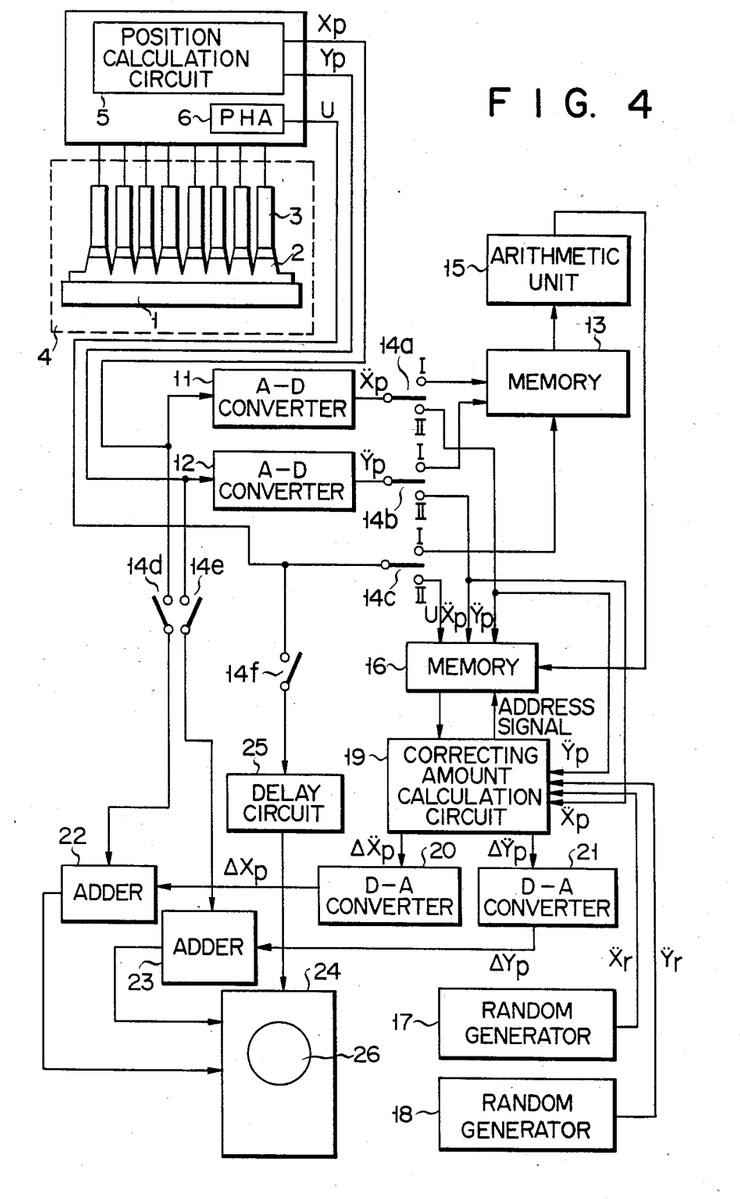
FIG. 4 is a block diagram showing the arrangement of an example of scintillation camera according to the present invention.
Figure 5:
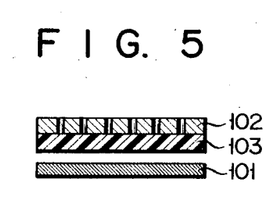
FIG. 5 is a cross sectional view showing a reference radiation source device employed in the scintillation camera shown in FIG. 4.
Figure 6:
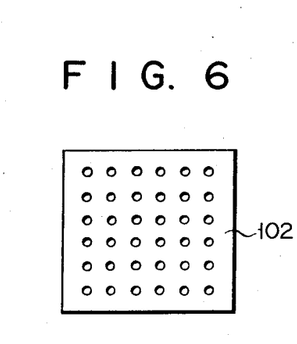
FIG. 6 is a plan view showing the reference radiation source device.

FIG. 4 shows the arrangement of an example of scintillation camera according to the present invention. The scintillation camera operates in a calibration mode and then measuring mode. To operate in the calibration mode, a reference radiation source device shown in detail in FIGS. 5 and 6 is used. The reference radiation source device includes a reference radiation source member 101 of plate type, a lead plate 102 spaced from the source member 101, and a plate 103 attached like a layer to the underside of lead plate 102 so as to prevent the lead plate 102 from being curved. The plate 103 is made of a material such as acrylic acid resin which allows gamma ray or radiation irradiated from the source member 102 to transmit therethrough. The lead plate 102 has a plurality of holes (6×6=36 holes, for example) arranged in matrix.

Calibration mode operation is carried out using the reference radiation source device having such arrangement and in this case a reference correcting amount at each of a plurality of cross points of a matrix is obtained from an amount of discrepancy between an actual position (or cross point) of each of the holes in the matrix of lead plate 102 and its corresponding measured position detected by a radiation detector and calculated by a position calculation circuit. The reference correcting amount at each of the cross points in the given matrix is stored in a memory to be used to calculate a reference amount relating to a position signal detected in a measuring cycle which is carried out after calibration.

During measuring mode operation, a radio-isotope is injected into a human body, for example, and the scintillator is arranged above the belly of human body to detect gamma ray or radiation irradiated from injected radio-isotope. An accurate position of radiation detected is calculated using the reference correcting amount stored in the memory in calibration mode.

A scintillation camera of the present invention will be now described in detail referring to FIG. 4.

Numeral 1 represents a scintillator for converting gamma ray or radiation irradiated from a radiation source to a plurality of light quanta. Numeral 2 represents a light guide for guiding light quanta to a photomultiplier tube (PMT) 3. The scintillator 1, light guide 2 and PMT 3 form a radiation detector 4. To the radiation detector 4 is connected a radiation position calculation circuit 5, which serves to calculate a position P(Xp,Yp) of radiation on X-Y coordinates on the basis of output signal applied from the radiation detector 4 and to output analog position signals Xp and Yp representing the position P(Xp,Yp). As already described, analog position signals Xp and Yp contain error components because the radiation detector 4 has a non-linear detection characteristic. Output signal of radiation detector 4 is inputted to a pulse height analyzer (PHA) 6, which serves to analyze the magnitude of output applied from the radiation detector 4 and to output UNBLANK signal U when the magnitude is in a predetermined range. The position calculation circuit 5 is connected to analog to digital (A/D) converters 11 and 12. The A/D converter 11 converts analog position signal Xp applied from the calculation circuit 5 to digital signal $\ddot{X}p$ while the A/D converter 12 converts analog position signal Yp to digital signal $\ddot{Y}p$. Digital signals are expressed like $\ddot{X}p$ and $\ddot{Y}p$ throughout the specification by adding dots " above symbols such as Xp and Yp representing analog position signals. A first memory 13 and an arithmetic unit 15 are used in calibration mode. Namely, in calibration mode a reference radiation source device shown in FIGS. 5 and 6 is arranged in front of scintillator 1 and the memory 13 receives, as address signals, through switches 14a and 14b digital position signals $\ddot{X}p$ and $\ddot{Y}p$ applied from A/D converters 11 and 12 in this case as well as through a switch 14c UNBLANK signal applied from the PHA 6. As the result, the matrix pattern of matrix-arranged holes in the lead plate 102 of reference radiation source device, in other words, the picture of a reference radiation source is stored in the memory 13 containing errors due to an inherent non-linear detection characteristic of radiation detector 4. The arithmetic unit 15 reads out of memory 13 picture data at cross points in the matrix successively and calculates reference correcting amounts at cross points in the given matrix on the basis of these data. A second memory 16 receives UNBLANK signal from the PHA 6 and digital position signals $\ddot{X}p$ and $\ddot{Y}p$ from A/D converters 11 and 12 and stores reference correcting amounts calculated by the arithmetic unit 15 relating to cross points in the given matrix. First and second random generators 17 and 18 receive UNBLANK signal U from the PHA 6 to independently generate random data of predetermined bit number. It is assumed in this embodiment that random generators 17 and 18 are five-bit shift registers. Five-bit random data are naturally outputted in this case. Random data are re-newed every time when UNBLANK signal U is received. A correcting amount calculation circuit 19 receives digital position signals $\ddot{X}p$ and $\ddot{Y}p$ and reads out of addresses (cross points) of memory 16 addressed by position signals reference correcting amounts stored in these addresses. To the correcting amount calculation circuit 19 are inputted at the same time random output data $\ddot{X}r$ of random generator 17 as a lower order bit of digital position signal $\ddot{X}p$ applied from the A/D converter 11 and random output data $\ddot{Y}r$ of random generator 18 as a lower order bit of digital position signal $\ddot{Y}p$ applied from the A/D converter 12. Data including position signal $\ddot{X}p$ of A/D converter 11 as a higher order bit and output random data $\ddot{X}r$ of random generator 17 as a lower order bit is processed as position signal Xp detected, and data including position signal $\ddot{Y}p$ of A/D converter 12 as a higher order bit and output random data $\ddot{Y}r$ of random generator 18 as a lower order bit is processed as position signal Yp detected in the correcting amount calculation circuit 19, thus allowing correcting amounts $\ddot{X}p$ and $\ddot{Y}p$ to be calculated.

A digital to analog (D/A) converter 20 converts calculated correcting amount $\ddot{X}p$ applied from the calculation circuit 19 to analog signal Xp and a D/A converter 21 converts calculated correcting amount $\ddot{Y}p$ applied from the calculation circuit 19 to analog signal Yp.

An adder adds analog position signal Xp applied from the position calculation circuit 5 to output correcting amount Xp applied from the D/A converter 20. An adder 23 adds analog position signal Yp applied from the position calculation circuit 5 to output correcting amount Yp applied from the D/A converter 21.

An oscilloscope 24 receives outputs applied from adders 22 and 23 as well as UNBLANK signal U applied from the PHA 6 through a delay circuit 25 to thereby display on the display screen thereof a tomogram in which non-linearity is corrected and distortion is removed to such an extent as possible. The delay circuit 25 serves to delay UNBLANK signal from the time when position signals Xp and Yp are outputted from the position calculation circuit 5 to the time when correcting amounts corresponding to position signals Xp and Yp are calculated in the calculation circuit 19 and these correcting amounts are added to position signals Xp and Yp applied from the calculation circuit 5.

A control circuit for controlling the whole system in timing is not shown in the block diagram of FIG. 4 for convenience of explanation.

Calibration mode will be now described in detail.

The reference radiation source device shown in FIGS. 5 and 6, for example, is arranged in front of scintillator 1 in this case.

Gamma ray or radiation irradiated from the radiation source member 101 transmits through the supporting plate 103 to be irradiated through matrix-arranged holes in the lead plate 102 to the scintillator 1. When gamma rays are irradiated through the holes to the scintillator 1, scintillation is caused at each point of scintillator 1 to which gamma ray is irradiated and light quanta having a magnitude corresponding to the energy of gamma ray are generated. Light quanta generated are inputted through the light guide 2 to the PMT 3. Light quanta is amplified in the PMT 3 to have an appropriate magnitude. Light quanta amplified in the PMT 3 are inputted, as output of radiation detector 4, to the position calculation circuit 5 and PHA 6. As already described, output of radiation detector 4 includes error components resulting from the non-linear detection characteristic of radiation detector 4. Therefore, a signal including error components is inputted to the calculation circuit 5 and PHA 6.

The calculation circuit 5 calculates an irradiation or radiation position of gamma ray on the basis of this input signal. Analog position signals Xp and Yp representing position P(Xp,Yp) which is obtained as the result of calculation are inputted to A/D converters 11 and 12 to be converted to digital position signals $\ddot{X}p$ and $\ddot{Y}p$. A/D converters 11 and 12 are not needed to have an extreme large quantizing bit number but may have so small a quantizing bit number as not to degrade resolving-power. It is assumed in this embodiment for convenience of explanation that each of A/D converters 11 and 12 has five bits as its quantizing bit number.

The PHA 6 finds whether or not the energy of inputted photo quanta i.e. radiation is in a predetermined range and outputs UNBLANK signal U when the energy is found to be in the predetermined range. In calibration mode, switches 14a, 14b and 14c are connected to sides of contact I while switches 14d, 14e and 14f are left open. Therefore, digital position signals $\ddot{X}p$ and $\ddot{Y}p$ are inputted to the memory 13 as address signals and designate their corresponding addresses in the memory 13. In the case where UNBLANK signal U has been inputted from the PHA 6 to the memory 13, logical "1" is added to contents of addresses designated by digital position signals $\ddot{X}p$ and $\ddot{Y}p$. The picture of matrix pattern of holes formed in the lead plate 102 of reference radiation source device, that is, the pattern of a reference radiation source is stored like this in the memory 13 containing error components due to non-linearity detection characteristic of radiation detector 4. Image data or picture data stored in the memory 13 are read out by the arithmetic unit 15 which comprises microcomputers, for example. The arithmetic unit 15 memorizes in its internal memory actual positions (or accurate positions) in the matrix of holes in the lead plate 102. The arithmetic unit 15 reads out of memory 13 picture data and calculates correcting amounts at cross points in the given matrix. Calculation of correcting amounts is carried out in such a way that the discrepancy between an accurate position (or cross point) in the given matrix previously stored in the internal memory of arithmetic unit 15 and its corresponding position (or cross point) in the matrix which is included in image data stored in the memory 13 is sought and that a correcting amount is calculated on the basis of that amount of discrepancy. Calculated reference correcting amount at each of cross points in the given matrix is stored in the second memory 16.

Calibration operation in calibration mode is finished as described above.

Measuring mode will be now described.

Position of radiation or gamma ray irradiated from radio-isotope injected into human body, for example, is detected in measuring mode. In this case, the scintillator 1 is arranged above human body and switches 14a, 14b and 14c are connected to contacts II while switches 14d, 14e and 14f are closed. Radiation is detected by the position detector 4 every scintillation event and calculation of its position is carried out by the calculation circuit 5. However, the process is similar to that in calibration mode and description of process is therefore omitted. Since switches 14a and 14b are connected to contacts II, five-bit digital position signals $\ddot{X}p$ and $\ddot{Y}p$ applied from converters 11 and 12 are inputted to the second memory 16 and correcting amount calculation circuit 19. Since switches 14d and 14e are closed, analog position signals Xp and Yp applied from the position calculation circuit 5 are inputted to adders 22 and 23, respectively. Since the switch 14c is connected to the contact II and the switch 14f is closed, UNBLANK signal U applied from the PHA 6 is inputted to random generators 17, 18 and delay circuit 25. In the case where UNBLANK signal U is outputted from the PHA 6 to the memory 16, reference correcting amounts at four cross points are read out of these four cross points in the matrix in the memory 16 by means of correcting amount calculation circuit 19, said four cross points in the matrix in the memory 16 enclosing position P(Xp,Yp) represented by position signals $\ddot{X}p$ and $\ddot{Y}p$. At the same time, five-bit random data $\ddot{X}r$ which is added, as a lower order bit, to position signal $\ddot{X}p$ and five-bit random data $\ddot{Y}r$ which is added, as a lower order bit, to position signal $\ddot{Y}p$ are respectively inputted from first and second generators 17 and 18 to the correcting amount calculation circuit 19. To the correcting amount calculation circuit 19 are therefore inputted ten-bit position signal ($\ddot{X}p+\ddot{X}r$) which includes five-bit position signal $\ddot{X}p$ as a higher order bit and five-bit random data $\ddot{X}r$ as a lower order bit and ten-bit position signal ($\ddot{Y}p+\ddot{Y}r$) which includes five-bit position signal $\ddot{Y}p$ as a higher order bit and five-bit random data $\ddot{Y}r$ as a lower order bit. Practicing equations (5) and (6) which are determined by relation of equations (1), (2), (3) and (4) expressed referring to FIGS. 1 and 2 and which will be described later, the correcting amount calculation circuit 19 calculates the correcting amount of position P($\ddot{X}p,\ddot{Y}p$) using reference correcting amounts at four cross points which enclose position P(Xp,Yp). Calculated correcting amount $\Delta \ddot{X}p$ is inputted to the D/A converter 20, converted to analog components $\Delta \ddot{X}p$ and then inputted to the adder 22. Y component $\Delta Yp$ is inputted to the D/A converter 21, converted to analog signal $\Delta Yp$ and inputted to the adder 23. Analog signal $\Delta Xp$ is added in the adder 22 to analog signal Xp applied from the position calculation circuit 5. Analog signal $\Delta Yp$ is added in the adder 23 to analog signal Yp applied from the position calculation circuit 5. Results of addition carried out in adders 22 and 23 are inputted as corrected position signals to the oscilloscope 24. When UNBLANK signal U is inputted from the delay circuit 25 in this case, the oscilloscope 24 visibly displays on the display screen 26 a position which is determined on X-Y coordinates by corrected position signals.

As described above, a tomogram of high accuracy is displayed on the display screen.

Figure 7:
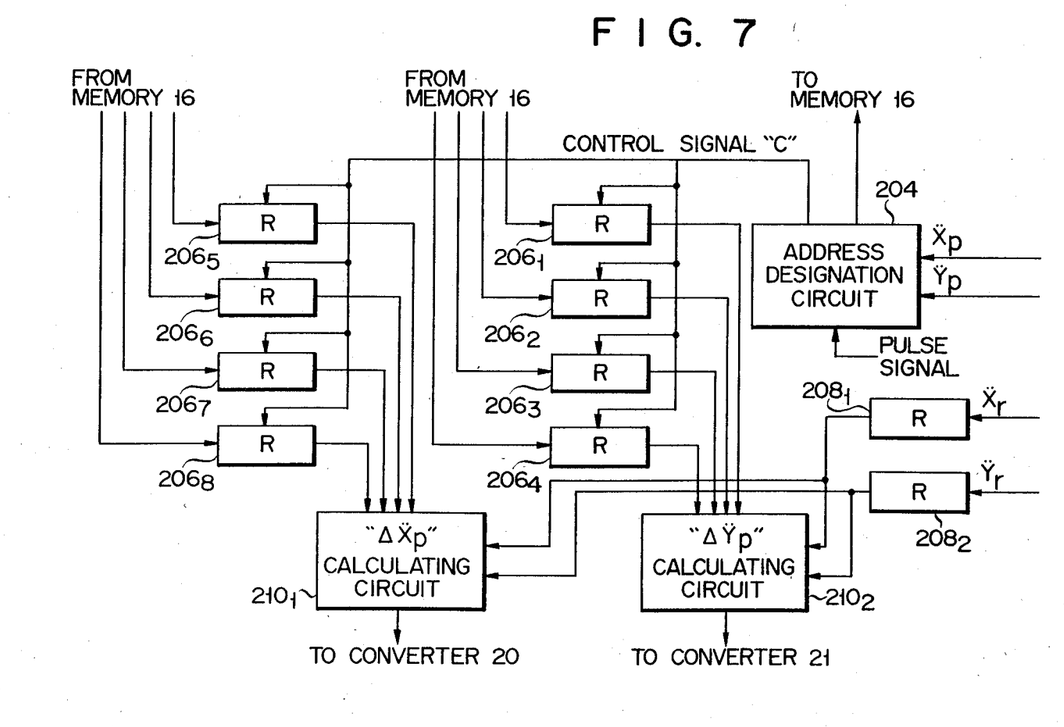
FIG. 7 shows the detailed arrangement of a correcting amount calculation circuit employed in the scintillation camera shown in FIG. 4.

The correcting amount calculation circuit 19 will be now described referring to the detailed block diagram shown in FIG. 7.

To the calculation circuit 19 are inputted five-bit position signal $\ddot{X}p$ of A/D converter 11 as a higher order bit MSB (most significant bit) of X component Xp in position signal and five-bit position signal $\ddot{Y}p$ of A/D converter 12 as a lower order bit LSB (least significant bit) of Y component Yp in position signal. To the calculation circuit 19 are also inputted five-bit random data $\ddot{X}r$ of random generator 17 as a lower order bit of X component in position signal and five-bit random data $\ddot{Y}r$ of random generator 18 as a lower order bit of Y component.

More concretely, position signals $\ddot{X}p$ and $\ddot{Y}p$ are inputted to an address designation circuit 204, where they are formed to ten-bit address signal which includes five bits of position signal $\ddot{Y}p$ as higher order bits and five bits of position signal $\ddot{X}p$ as lower order bits. This address signal is inputted to the memory 16 to designate point A shown in FIG. 1. Synchronizing with pulse signal applied from outside, the address designation circuit outputs successively address signal formed by adding "1" to ten-bit address signal and designating point "D", address signal formed by further adding "32" in decimal code when the matrix of memory 16 is 32×32 and designating point "C", and address signal formed by subtracting "1" from the address signal, which designates point "C", and designating point "B". The address designation circuit 204 also outputs control signal C to registers $206_1$, $206_2$, $206_3$, $206_4$, $206_5$, $206_6$, $206_7$ and $206_8$. Registers $206_1$–$206_8$ store under control of control signal C reference correcting amounts at points A, B, C and D which are read out of memory 16. To be more concrete, registers $206_1$ and $206_5$ store reference correcting amounts $\Delta Y_{i,j}$ and $\Delta X_{i,j}$ at point A. Registers $206_2$ and $206_6$ store reference correcting amounts $\Delta Y_{i+1,j}$ and $\Delta X_{i+1,j}$ at point D. Registers $206_3$ and $206_7$ store reference correcting amounts $\Delta Y_{i+1,j+1}$ and $\Delta X_{i+1,j+1}$ at point C. Registers $206_4$ and $206_8$ store reference correcting amounts $\Delta Y_{i,j+1}$ and $\Delta X_{i,j+1}$ at point B.

Five-bit random data $\ddot{X}r$ is applied from the random generator 17 to a register $208_1$ and stored in it. As already described, random data $\ddot{X}r$ is used as lower grade bits of X component in position signal and designates the position of point P at random when point A is regarded as an origin. Five-bit random data $\ddot{Y}r$ is applied from the random generator 18 to a register $208_2$ and stored in it. Random data $\ddot{Y}r$ is similarly used as lower order bits of Y component in position signal and represents the position of point P at random when point A is regarded as an origin.

$\Delta\ddot{X}p$ calculating circuit 210 calculates the correcting amount $\Delta\ddot{X}p$ of position signal $\ddot{X}p$ on the basis of random data $\ddot{X}r$ and $\ddot{Y}r$ applied from registers $208_1$ and $208_2$ and output reference correcting amounts applied from registers $206_5$–$206_8$. $\Delta\ddot{Y}p$ calculating circuit $210_2$ similarly calculates the correcting amount $\Delta\ddot{Y}p$ of position signal $\ddot{Y}p$ on the basis of random data $\ddot{X}r$ and $\ddot{Y}r$ applied from registers $208_1$ and $208_2$ and output reference correcting amounts applied from registers $206_1$–$206_4$.

To explain the operation, when the address designation circuit 204 receives position signals $\ddot{X}p$ and $\ddot{Y}p$, it outputs to the memory 16 ten-bit address signal which includes five bits of signal $\ddot{X}p$ as higher grade bits and five bits of signal $\ddot{Y}p$ as lower grade bits, and designates the predetermined cross point A in the memory 16 by means of this address signal. The address designation circuit 204 also outputs control signal C to registers $206_1$–$206_8$ at the same time. Being controlled by this control signal C, registers $206_1$ and $206_5$ store correcting amounts $\Delta Y_{i,j}$ and $\Delta X_{i,j}$ which are read out of cross point A designated by address signal. When correcting amounts $\Delta Y_{i,j}$ and $\Delta X_{i,j}$ are stored, address signal to which "1" is added to designate point D is outputted from the address designation circuit 202 to the memory 16. Reference correcting amounts $\Delta Y_{i+1,j}$ and $\Delta X_{i+1,j}$ at cross point D in the memory 16 are thus stored in registers $206_2$ and $206_6$, respectively. Address signal to which only 32 is added in decimal mode to designate point C is then outputted to the memory 16. Reference correcting amounts $\Delta Y_{i+1,j+1}$ and $\Delta X_{i+1,j+1}$ are read out of cross point C in the memory 16 and stored in registers $206_3$ and $206_7$. Address signal from which "1" is subtracted to designate point B is then outputted from the address designation circuit 204 to the memory 16. Reference correcting amounts $\Delta Y_{i,j+1}$ and $\Delta X_{i,j+1}$ are thus read out of cross point B in the memory 16 and stored in registers $206_4$ and $206_8$, respectively.

As described above, reference correcting amounts from the memory 16 are stored in registers $206_1$–$206_8$ while $\ddot{Y}r$ which is used as lower order bits of Y component in input position signal and $\ddot{X}r$ which is used as lower order bits of X component in input position signal are applied from random generators 17 and 18 to registers $208_1$ and $208_2$, respectively, and stored in them.

Correcting amounts stored in registers $206_1$ and $206_4$ as well as random data $\ddot{X}r$ and $\ddot{Y}r$ stored in registers $208_1$ and $208_2$ are inputted to the $\Delta\ddot{Y}$ calculating circuit $210_2$. Similarly, correcting amounts stored in registers $206_5$ and $206_8$ as well as random data $\ddot{X}r$ and $\ddot{Y}r$ stored in registers $208_1$ and $208_2$ are input to the $\Delta X$ calculating circuit $210_1$. Calculation circuits $210_1$ and $210_2$ calculate correcting amounts $\Delta\ddot{X}p$ and $\Delta\ddot{Y}p$ relative to X and Y components in position signal. Correcting amounts $\Delta\ddot{X}p$ and $\Delta\ddot{Y}p$ can be obtained by operating the following equations (5) and (6) in calculation circuits $210_1$ and $210_2$.

$$\Delta\ddot{X}p = 1/a^2\{\Delta X_{i,j}(a-\ddot{X}r)(a-\ddot{Y}r) + \Delta X_{i+1,j}\ddot{X}r(a-\ddot{Y}r) + \Delta X_{i,j+1}(a-\ddot{X}r)\ddot{Y}r + \Delta X_{i+1,j+1}\ddot{X}r\cdot\ddot{Y}r\} \quad (5)$$

$$\Delta\ddot{Y}p = 1/a^2\{\Delta Y_{i,j}(a-\ddot{X}r)(a-\ddot{Y}r) + \Delta Y_{i+1,j}\ddot{X}r(a-\ddot{Y}r) + \Delta Y_{i,j+1}(a-\ddot{X}r)\ddot{Y}r + \Delta Y_{i+1,j+1}\ddot{X}r\cdot\ddot{Y}r\} \quad (6)$$

"a" represents the number of lines (or columns) of matrix in the memory 16. (a-$\ddot{X}r$) and (a-$\ddot{Y}r$) can be easily obtained by binary calculation as complements of 32 of $\ddot{X}r$ and $\ddot{Y}r$. Calculation circuits $210_1$ and $210_2$ can be easily arranged by conventionally well known technique so as to achieve operation of equations (5) and (6).

As apparent from the above, the present invention provides an arrangement in which two independent random generators 17 and 18 are arranged to output two independent random data every scintillation event and these two independent random data are added, as lower order bits, to position signals Xp and Yp which are A/D-converted by A/D converters 11 and 12. Therefore, point in quantizing unit mesh M1, for example, and A/D-converted as shown in FIG. 3 is not recognized as an A/D-converted typical point MP1 but as a point in unit mesh M1 which is determined at random according to the value of random data. Because random data are added, as lower order bits, to output position signals applied from A/D converters 11 and 12 and therefore function to determine at random in quantizing unit mesh M1 the typical point which is determined by position signals applied from A/D converters 11 and 12. Namely, points in unit mesh M1 are not recognized as a typical point but processed as a plurality of points spreading in unit mesh M1. And correcting amount is sought relating to the point recognized like this. Therefore, positions as the result of adding correcting amounts thus obtained to position signals Xp and Yp are not concentrated in region M1' but regularly distributed these similarly to the case where detected position signal is A/D-converted finely enough, that is, each of A/D converters 11 and 12 is adapted to have a quantizing bit number increased enough. Same thing can be said about other unit meshes MP2, MP3, . . . .

Correcting amounts can be obtained in the position region defined by added random data without direct relation to actual radiation positions but the spreading of position signals due to random data is carried out in such a way that points practically spread are once unified by A/D conversion to a typical point and again spread in the region where these points are originally spread. Therefore, when quantizing bit number of A/D conversion is selected to such a value as keeps desired resolving-power, position calculation of high accuracy can be achieved.

According to the present invention, therefore, a tomogram of high accuracy in which non-linearity is corrected can be obtained even if quantizing bit number of each of A/D converters is made so few as to keep resolving-power.

Figure 8:
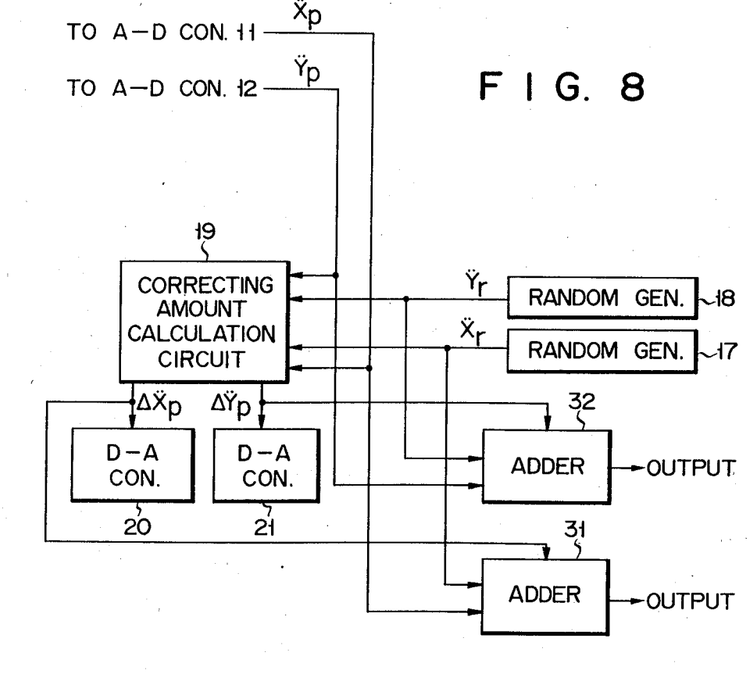
FIG. 8 shows the arrangement of scintillation camera to which a digital output device is further added.

In the case where position signals obtained after correction are provided as digital outputs to be applied to the data processing device and the like, there may be arranged as shown in FIG. 8 a digital adder 31 for adding $\Delta \ddot{X}p$ output applied from the correcting amount calculation circuit 19 to data including position signal $\ddot{X}p$ of A/D converter 11 as higher order bits and random data $\ddot{X}r$ of random generator 17 as lower grade bits, and a digital adder 32 for adding $\Delta \ddot{Y}p$ output applied from the correcting amount calculation circuit 19 to data including position signal $\ddot{Y}p$ of A/D converter 12 as higher order bits and random data $\ddot{Y}r$ as lower grade bits, thus allowing added outputs to be lead out of digital adders 31 and 32.

Instead of random generators, means for generating data approximate to random data may be used as random generator means. It may be arranged, for example, that outputs of two triangular wave generators arranged are sampled by UNBLANK signal U and that their values thus obtained are A/D-converted. Two triangular wave generators for outputting triangular waves not synchronized with each other may be arranged in this case to obtain independent random data relating to X and Y components Xp and Yp.

Each of A/D converters 11 and 12 is adapted to have five bits in the embodiment of the present invention, but their quantizing bit number may be so few as to keep resolving-power. Quantizing bit number of A/D converters 11 and 12 and that of random generators 17 and 18 are adapted to have five bits, but they may be different from each other according to the mode of use.

It should be understood that the present invention is not limited to the above-described embodiment and that a variety of modifications can be made without departing from the spirit and scope of the invention.

What is claimed is:

1. A non-linearity correction apparatus for a scintillation camera including a radiation detector, the scintillation camera providing an analog position-coordinate signal defining a position of each of a plurality of image events and an energy signal representing an energy level corresponding to each such image event, the position signal being inaccurate as a result of a non-linear response of the radiation detector, the non-linearity correction apparatus comprising:

A/D converter means for converting the analog position-coordinate signal from the scintillation camera to an N-bit digital position-coordinate signal;

a correction amount memory for storing a plurality of correction values defining the non-linearity of the response of the radiation detector at a plurality of position points of its field of view;

means coupled to said A/D converter means, for establishing during calibration mode operation said correction values and storing them in said correction amount memory, random data generator means for generating n-bit random data;

means for combining, during measuring mode operation, the n-bit random data from said random data generator means with the N-bit signal from said A/D converter means by adding the n-bit random data as lower order bits following the least significant bit of the N-bit A/D converter signal, thereby causing the resulting combined signal to be an N+n bit quanta;

a correction amount calculating circuit means for calculating based on said N+n bit quanta and correction values read from said correction amount memory, a digital correction amount applicable to said analog position coordinate signal for correcting the non-linear response of the radiation detector;

D/A converter means, coupled to said correction amount calculation circuit, for receiving said digital correction amount signals therefrom and providing analog correction amount signals indicative thereof; and means for combining said analog correction amount signals with said analog position coordinate signals from said scintillation camera during measuring mode operation to provide non-linear corrected positional signals.

2. A non-linearity correction apparatus according to claim 1, wherein said correction amount calculating amount means includes an address designation circuit for applying an address signal to read a reference correcting amount from said correction amount memory on the basis of position signals applied from said A/D converter means; first register means for storing reference correcting amounts read out; second register means for storing the random data from said random data generator means; and calculating means for calculating correcting amounts relating to said position-coordinate signal on the basis of the reference correcting amounts stored in said first register means and the random data stored in said second register means.

3. A non-linearity correction apparatus according to claim 1, further comprising a reference radiation source having a plurality of holes arranged in a matrix for use in establishing said plurality of correction values stored in said correction amount memory.

* * * * *

UNITED STATES PATENT AND TRADEMARK OFFICE
CERTIFICATE OF CORRECTION

PATENT NO. : 4,566,074

DATED : January 21, 1986

INVENTOR(S) : Mineki Nishikawa

It is certified that error appears in the above-identified patent and that said Letters Patent is hereby corrected as shown below:

Information in Box [73] should read:

--Assignees: Tokyo Shibaura Denki Kabushiki Kaisha, of Kawasaki, Japan--

Signed and Sealed this

Twenty-eighth Day of October, 1986

[SEAL]

*Attest:*

DONALD J. QUIGG

*Attesting Officer*  *Commissioner of Patents and Trademarks*